United States Patent [19]

Glodis et al.

[11] Patent Number: 4,641,917
[45] Date of Patent: Feb. 10, 1987

[54] SINGLE MODE OPTICAL FIBER

[75] Inventors: Paul F. Glodis, Atlanta; Terrence A. Lenhan, Chamblee, both of Ga.

[73] Assignee: AT&T Bell Laboratories, Murray Hill, N.J.

[21] Appl. No.: 699,641

[22] Filed: Feb. 8, 1985

[51] Int. Cl.$^4$ ............................................. G02B 6/22
[52] U.S. Cl. ................................................ 350/96.33
[58] Field of Search ............... 350/96.33, 96.29, 96.30, 350/96.31

[56] References Cited

U.S. PATENT DOCUMENTS

| | | | |
|---|---|---|---|
| 4,217,027 | 8/1980 | MacChesney et al. | 350/96.30 |
| 4,372,647 | 2/1983 | Okamoto et al. | 350/96.33 |
| 4,435,040 | 3/1984 | Cohen et al. | 350/96.33 |
| 4,447,127 | 5/1984 | Cohen et al. | 350/96.33 |

FOREIGN PATENT DOCUMENTS 2116744  9/1983  United Kingdom ............. 350/96.33

OTHER PUBLICATIONS

*The Bell System Technical Journal*, vol. 62, Nov. 1983, "Calculation of Modes in an Optical Fiber Using the Finite Element Method and EISPACK" by T. A. Lenahan, pp. 2663-2694.
*Electronics Letters*, vol. 20, No. 10, May 10, 1984, "Low-Dispersion Single-Mode Silica Fibre with Un-doped Core and Three F-Doped Claddings" by H. Etzkorn et al, pp. 423-424.
*Journal of Lightwave Technology*, vol. LT-2, No. 3, Jun. 1984, "Equivalent Optical Waveguides" by Richard J. Black et al., pp. 268-276.
*Electronics Letters*, vol. 21, No. 1, Jan. 3, 1985, "Observation of Modal Noise in Single-Mode-Fibre Transmission Systems" by N. K. Cheung, pp. 5-7.

*Primary Examiner*—William L. Sikes
*Assistant Examiner*—Robert E. Wise
*Attorney, Agent, or Firm*—Eugen E. Pacher

[57] ABSTRACT

A single mode optical fiber comprises a core, a first cladding surrounding the core, and a second cladding surrounding the first cladding. It also comprises a third cladding region (or index "ring"). The core, has radius a and refractive index $n_c$, the first, second, and third cladding regions have inner radii, $R_{1i}$, $R_{2i}$, and $R_{3i}$, outer radii $R_{1o}$, $R_{2o}$, and $R_{3o}$, and indices $n_1$, $n_2$, $n_3$, respectively. The fiber has $n_1 < n_3$, $R_{1o} \leq R_{3i}$, $R_{3o} \leq R_{2i}$. In preferred embodiments, $a = R_{1i}$, $R_{1o} = R_{3i}$, $R_{3o} = R_{2i}$. Appropriate choice of ring parameters can result in a lowering of the cut-off wavelength of the fiber, or in fiber that is less sensitive to macrobending than similar prior art fiber lacking an index ring, without substantial change in fiber parameters that depend primarily on the waveform in the core. An optical fiber communications system comprising the inventive fiber is also disclosed.

20 Claims, 6 Drawing Figures

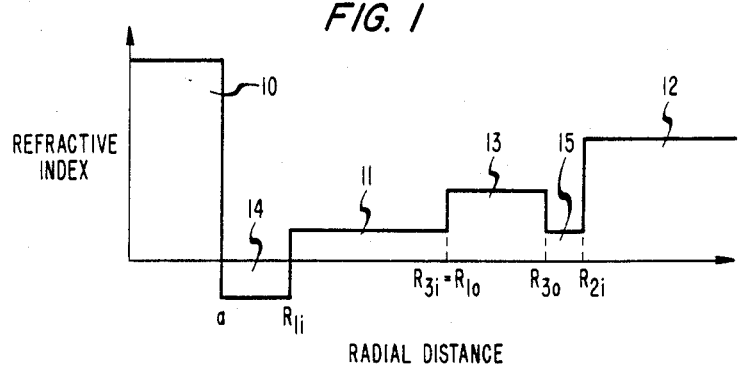
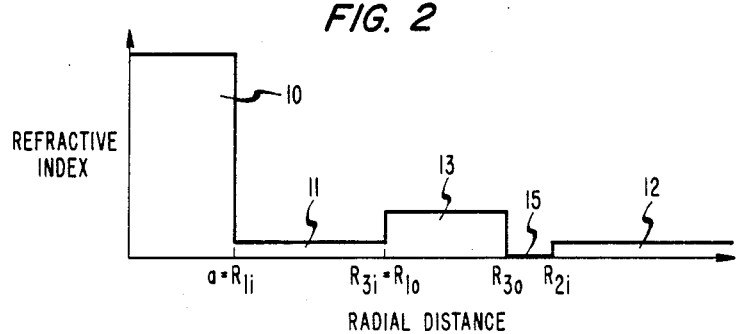
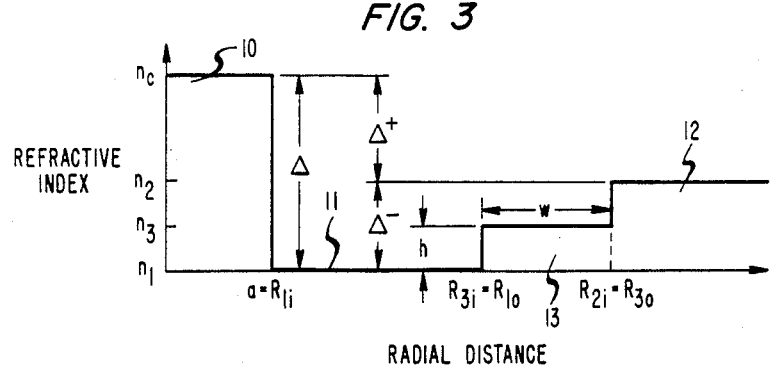

($\lambda = 1.55\mu m$)

SINGLE MODE OPTICAL FIBER

FIELD OF THE INVENTION

This invention pertains to optical fiber, and to a communications system comprising such fiber.

BACKGROUND OF THE INVENTION

Although optical fiber communications is a relatively young field, it has reached by now a high level of sophistication. For instance, single mode optical fiber that permits repeater spacings of the order of 30 km and transmission rates of the order of hundreds of megabits/seconds is now available.

Almost all currently used high performance optical fiber is silica-based fiber (comprising more than 50% by weight, typically more than 80%, of $SiO_2$) typically with a core region having a relatively high refractive index, surrounded by one or more cladding regions of lower refractive index than the core. The indices are raised or lowered, relative to the refractive index of silica, by means of dopants. As is well known, Ge, Al, and P, for instance, raise the refractive index of silica, whereas F and B lower it. Methods for producing optical fiber are well known to those skilled in the art and need no review here. See, for instance, U.S. Pat. No. 4,217,027.

Single mode optical fiber, i.e., optical fiber in which only the fundamental mode (to be designated herein $LP_{01}$) of electromagnetic radiation of wavelength equal to the operating wavelength of the fiber propagates with low loss, can have a variety of known index profiles. Typically, the core region and the surrounding cladding region consist of high purity deposited glass material, which is frequently surrounded by a further cladding region consisting of glass derived from a frequently much less pure silica substrate or sleeve tube. The core region typically has a refractive index that is greater than, or at least not less than, that of pure silica, and the deposited cladding region immediately surrounding the core typically has a refractive index that is equal to or less than that of pure silica. The normalized difference between the core refractive index and the refractive index of the cladding region immediately surrounding the core, often designated $\Delta$, is typically of the order of 1% or less. For instance, in a commercially available single mode optical fiber, the core has an effective diameter of about 8 μm, and $\Delta$ of about 0.40%. In that fiber, the deposited cladding region surrounding the core has an outer radius that is about 6.5 times the radius of the core, and has a normalized refractive index that is about 0.15% less than that of silica. The deposited cladding is surrounded by a second cladding region consisting of material derived from a silica substrate tube, resulting in a fiber outside diameter of about 125 μm. The above described fiber is an example of "depressed" cladding fiber. See, for instance, U.S. Pat. No. 4,447,127, and H. Etzkorn et al, *Electronics Letters*, Vol. 20 (10), pp. 423-424 (1984). In a "matched" cladding fiber the refractive index of the deposited cladding is substantially equal to that of silica, and therefore, to that of the outer cladding.

Fibers with more complicated index profiles comprising a multiplicity of deposited cladding regions are also known. See, for instance, U.S. Pat. No. 4,435,040, and U.S. patent application Ser. No. 357,053, filed Mar. 11, 1982 by L. G. Cohen et al. The multiple cladding regions known to the prior art typically are designed to affect the transmission characteristics of the optical fiber. In particular, such profiles may be designed to lead to increased bandwidth of the fiber, since the additional cladding layers make it possible to produce fiber having two or more wavelengths of zero dispersion, with low dispersion between the zero-dispersion wavelengths.

A characteristic parameter of optical fiber is the cut-off wavelength $\lambda_c$, namely, that wavelength above which only the fundamental mode can propagate over significant distances in the fiber. For step index fiber, the theoretical cut-off wavelength is defined by $V = 2.405$, where $V = ka(n_c^2 - n_1^2)^{\frac{1}{2}}$, with $n_c$ being the core refractive index, and $n_1$ the refractive index of the deposited cladding surrounding the core. $k = 2\pi/\lambda$, where $\lambda$ is the wavelength, and a is the radius of the core.

It is to be noted that the index profiles of real fibers typically only approximate the ideal profiles used in theoretical work. However, it is essentially always possible to define an equivalent profile in which all fiber regions have well-defined indices and radii, with the "equivalent" fiber having essentially the same transmission properties as the fiber which it represents. See, for instance, R. J. Black et al, *Journal of Lightwave Technology*, Vol. LT-2, No. 3, June 1984, pp. 268-276. It is to be understood that the terms "refractive index" and "radius" of a fiber region herein are intended to refer to the equivalent index and equivalent radius of the fiber region, unless otherwise noted.

Although the theoretical cut-off wavelength of a single mode fiber is well defined, in actual fibers the attenuation of higher order modes (most importantly, the first higher order mode designated $LP_{11}$) does not become infinite discontinuously, but rather increases over a range of wavelengths. Thus, it is usual practice to define an experimental cut-off wavelength, which typically differs somewhat from the theoretical cut-off wavelength. For instance, the experimental cut-off wavelength can be defined as that wavelength at which the attenuation of $LP_{11}$ is 4 dB/m. The term "cut-off wavelength" herein is intended to refer to the experimental cut-off wavelength, unless otherwise noted.

In single mode optical fibers, the fundamental mode should have the lowest possible loss even when the fiber is bent, and the higher order modes should either be absent or have sufficiently high attenuation at the operating wavelength, to avoid significant intermodal dispersion and modal noise. Changes in the index profile of a fiber that strengthen the guiding of the fundamental mode, to thereby reduce the susceptibility of the fiber to macrobending loss (e.g., increasing the V-number by increasing $\Delta$) often strengthen the guiding of higher order modes as well, and thus may not be able to simultaneously further both of the above objectives.

We are disclosing herein a new fiber profile that promotes differential mode attenuation, allowing the fundamental mode guiding to be strengthened relative to that of the secondary modes.

SUMMARY OF THE INVENTION

Disclosed is an optical fiber communications system that comprises at least one source of electromagnetic radiation, at least one optical fiber that is part of an optical fiber transmission path, means for coupling radiation into the fiber transmission path, the radiation being guided axially through the fiber transmission path to an output location, where the radiation is typically detected by a radiation detector. The fiber transmission path can be a single length of fiber, or it can consist of a multiplicity of optically coupled segments. At least part of the fiber transmission path consists of fiber according to the invention. Fiber according to the invention is single mode optical fiber at the operating wavelength of the system, the fiber having a core region, at least a first cladding region concentrically surrounding the core, and a second cladding region concentrically surrounding the first cladding region. The inventive fiber further comprises a third cladding region which will frequently be referred to as a "ring". The core and the first, second, and third cladding regions have equivalent refractive indices $n_c$, $n_1$, $n_2$, and $n_3$, respectively. Furthermore, the core has an effective radius a, the first, second, and third cladding regions have effective inner radii $R_{1i}$, $R_{2i}$, and $R_{3i}$, and effective outer radii $R_{1o}$, $R_{2o}$, and $R_{3o}$, respectively. Furthermore, $n_3 < n_1$, $R_{3o} \leq R_{2i}$, and $R_{3i} \geq R_{1o}$. The fiber parameters, e.g., $R_{3i}$, $R_{3o}$, and $n_3$, are chosen such that, for radiation of wavelength equal to the operating wavelength of the system, at $R_{3i}$ the square of the amplitude of $LP_{01}$ is at most $10^{-5}$ of the square of the amplitude of that mode at the center of the core. The parameters are also chosen such that at $R_{2i}$ the square of the amplitude of the $LP_{11}$ mode is at least 50% larger than that of the $LP_{11}$ mode of a second (reference) fiber that is identical in all respects to the inventive fiber, except that in the reference fiber $R_{3i} = R_{3o}$ (i.e., no ring is present), with the comparison being made at a wavelength equal to the cut-off wavelength of the reference fiber. Also, in the fiber according to the invention, at the operating wavelength, the square of the amplitude of the $LP_{01}$ mode at $R_{2i}$ is at most 50% larger than that of the $LP_{01}$ mode of the reference fiber at the same radius and wavelength. These conditions assure that the presence of the ring does not substantially affect such fiber properties as spot size, bandwidth and macrobending sensitivity, but does have a substantial effect on the guiding of higher order modes.

In preferred embodiments, the first and third cladding regions are deposited cladding, whereas the second cladding region consists of less pure tube-derived silica, with $R_{3o} = R_{2i}$. In preferred embodiments of the depressed cladding type, typically $n_1 < n_3 < n_2$. In at least some preferred embodiments, we have found it to be advantageous if $R_{3i} \geq 4a$, where a is the core radius. In preferred depressed cladding fiber the "height" h of the ring is between 10% and 75% of $\Delta^-$, the (to be defined) normalized cladding index depression.

Fiber according to the invention can have a lower cut-off wavelength than comparable prior art fiber, or can be less sensitive to macrobending, without substantial change in such important fiber parameters as spot size and dispersion, which primarily depend on the wave form in the core. In conjunction with appropriate core parameter changes, microbending and/or macrobending sensitivity can be reduced without change in cut-off wavelength.

As will be appreciated by those skilled in the art, the ability to lower the cut-off wavelength of a fiber, without substantially altering fiber characteristics that depend primarily on the waveform in the core, gives added design freedom. For instance, this ability is considered to be useful for designing dual (or multiple) "window" fibers (e.g., fiber having two operating wavelengths, such as 1.31 μm and 1.55 μm), since it may permit reducing $\lambda_c$ below the shortest operating wavelength, while retaining otherwise advantageous values of $n_c$, $n_1$, and a. Fiber according to the invention also can, for instance, be advantageously used when short lengths of fiber (e.g., fractions of a meter to a few meters) are to be inserted into a fiber communications system. As is well known, the actual cut-off wavelength of optical fiber is somewhat length dependent, with a short length of fiber having a cut-off wavelength greater than that of an otherwise identical longer length of fiber. Short lengths of fibers must frequently be present in fiber communications systems, for instance, as "pigtails" for coupling radiation sources or detectors into the system, or as "patch cord", either temporarily or permanently. Use of short lengths and long lengths of the same fiber in the same transmission path, however, may result in the introduction of modal noise, and thus result in degradation of system performance. See, N. K. Cheung et al, *Electronics Letters*, Vol. 21(1), pp. 5–7 (1985). Use of short lengths of fiber according to the invention may prevent such degradation.

BRIEF DESCRIPTION OF THE DRAWINGS

FIGS. 1, 2, and 3 depict exemplary refractive index profiles of fibers according to the invention;

DETAILED DESCRIPTION

Figure 4:
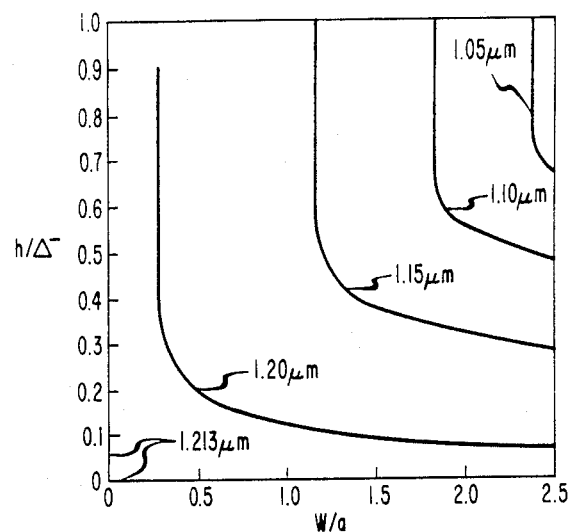
FIG. 4 shows cut-off contours for depressed index fibers according to the invention, for a range of ring parameters.

A central aspect of the invention is the addition of an index ring, i.e., of a relatively narrow cladding region having an index that is greater than that of a first cladding region enclosed by the ring, at an appropriate radial distance from the core of the fiber.

FIGS. 1–3 show exemplary index profiles of fibers according to the invention. In all three figures, numerals 10 refer to the fiber core, 11 to the first cladding region (typically deposited cladding), 12 to the second cladding region (typically consisting of material derived from a silica substrate or sleeve tube), and 13 to the third cladding region, the index ring. In all three figures only the right half of the relevant profile is shown, and the profiles are understood to schematically represent equivalent step index profiles. The refractive indices are referred to an arbitrary origin, and absolute and relative radial distances and refractive indices are not intended to be to scale. Although the (equivalent) profiles of FIGS. 1–3 show only step changes in refractive index, this is not a necessary requirement. For instance, the core can have a graded index, e.g., a triangular or parabolic profile. Such profiles are well known to the practitioner. In case of a graded index core, $n_c$ is intended to refer to the maximum equivalent index value in the core. In principle the transitions between cladding layers could also be graded.

FIG. 1 shows the profile of an exemplary multiple depressed cladding fiber having a "trench" 14 between the core and the first cladding region, and a "gap" 15 between ring 13 and second cladding 12. The core radius is a, the inner and outer radii of the first cladding region are $R_{1i}$ and $R_{1o}$, respectively, the inner and outer radii of the ring are $R_{3i}$ and $R_{3o}$, respectively, and the inner radius of the second cladding region is $R_{2i}$, with the outer boundary of the fiber not being shown. The same symbols are used in FIGS. 2 and 3. FIG. 1 is intended to be exemplary only. For instance, it is not necessary that $R_{3i}=R_{1o}$.

FIG. 2 shows the profile of an exemplary fiber having substantially matched indices, with a gap 15 between the ring and the second cladding region. Of course, it will be appreciated that such a gap need not be present, and indeed frequently will not be present in matched cladding fibers according to the invention. FIG. 3 depicts the profile of an exemplary fiber having depressed index cladding. The Figure also illustrates the meaning of the refractive indices $n_c$, $n_1$, $n_2$, and $n_3$, and of the normalized indices $\Delta$, $\Delta^+$, and $\Delta^-$, as well as those of the ring parameters W and h.

Although the invention can be practiced with multiple cladding fibers, it is currently believed that the invention can be most advantageously used in fibers that have only two cladding regions, in addition to the ring. An exemplary profile of such fiber is depicted in FIG. 3. The profile of FIG. 2 is also of this type if $R_{3o}=R_{2i}$. The discussion below is primarily in terms of a depressed cladding fiber of the type shown in FIG. 3. This is for purposes of concreteness only, and is not intended to imply that the invention is so limited. Those skilled in the art will appreciate that the principles of the invention can be applied to other fiber types as well, and will easily be able to do so.

The normalized index differences $\Delta$, $\Delta^+$, and $\Delta^-$, and the "height" h and "width" W of the ring are defined as follows:

$$\Delta^+ =(n_c^2-n_2^2)/2n_2^2$$

$$\Delta^- =(n_2^2-n_1^2)/2n_2^2$$

$$\Delta=\Delta^+ +\Delta^-$$

$$h=\Delta_R/\Delta^-,$$

where $$\Delta_R=(n_3^2-n_1^2)/2n_2^2.$$

We have discovered that by appropriate choice of fiber parameters, especially of ring parameters such as h, W and $R_{3i}$, it is possible to strengthen the guiding properties of the fiber for the $LP_{01}$ mode relative to $LP_{11}$ and other higher order modes. This in turn can result in lower macrobending loss of the fiber, in a reduced cut-off wavelength, in reduced microbending loss, in improved manufacturability of the fiber, or in combinations of the above, without significantly affecting such important fiber parameters as bandwidth and spot size.

In general, the ring parameters are to be chosen such that, at the operating wavelength (or wavelengths) of the system, the amplitude of the $LP_{01}$ mode at $R_{3i}$ is very small, typically such that the square of the amplitude at $R_{3i}$ is less than $10^{-5}$ of the square of its amplitude at the center of the core. Furthermore, the parameters are also to be chosen such that at $R_{2i}$ the square of the amplitude of the $LP_{11}$ mode is at least 50%, preferably more than 100%, larger than the square of the amplitude of the $LP_{11}$ mode in a second fiber that does not have a ring but is identical to the inventive fiber in all other respects, the comparison being made at the cut-off wavelength of the second fiber. And lastly, the parameters are to be chosen such that, in the fiber according to the invention, at the operating wavelength(s), the square of the amplitude of the $LP_{01}$ mode at $R_{2i}$ is at most 50%, preferably no more than 10%, larger than that of the $LP_{01}$ mode of the second fiber, at the same radius and wavelength(s). The first condition assures that the influence of the ring on fiber parameters such as spot size and bandwidth is substantially negligible, whereas the latter two assure substantial differential attenuation of $LP_{11}$ relative to $LP_{01}$.

As will be appreciated by practitioners of the art, the above referred to mode amplitudes can, for essentially any given fiber, be reliably determined by means of calculation. A particularly advantageous calculation method is described in T. A. Lenahan, *The Bell System Technical Journal*, Vol. 62(9), November 1983, pp. 2663-2694. After determination of the refractive index profile of a fiber or of a fiber preform (see, for instance, page 2688 of the above Lenahan reference for an example of an actual preform profile) by known methods, the mode amplitude can be calculated for any mode, wavelength, or radial position in the fiber. For some other computational methods, it may be required that the equivalent profile be determined first. It will also be understood that, in order to facilitate comparison of the inventive fiber with the reference fiber, normalized mode amplitudes are to be computed, and all comparisons herein refer to normalized amplitudes.

We will next present some simple theoretical considerations. It can be shown that, for fiber with a single inner cladding region, the leakage loss for a higher order mode is directly proportional to the square of the amplitude of the mode at $R_{2i}$. Likewise, bending loss for $LP_{01}$ is approximately proportional to the square of the amplitude of $LP_{01}$ at $R_{2i}$. Since both $LP_{01}$ and higher order modes have radially exponentially decaying waveforms in the inner cladding region, the radial decay constants are approximately $$\eta_j=(2\pi/\lambda)(n_{e,j}^2-n_1^2)^{\frac{1}{2}}$$

where j=1 for $LP_{01}$, j=2 for $LP_{11}$, etc., and $n_{e,j}$ is the effective refractive index for the jth mode. For a definition of the effective index of a mode, see, for instance, page 2673, equations 44 and 45, of the above cited paper by Lenahan. Typically, at a wavelength above the cut-off wavelength $\lambda_c$, $n_{e,1} > n_{e,2}$, and therefore, $\eta_1 > \eta_2$.

Addition of a ring to the profile causes the decay constants in the ring region to change to $$\eta_j'=(2\pi/\lambda)(n_{e,j}^2-n_3^2)^{\frac{1}{2}},$$

with the decay constants satisfying $$1 \geq (\eta_1'/\eta_1) > (\eta_2'/\eta_2) \geq 0.$$

This shows that the ring has proportionately greater effect on higher order modes than on the fundamental mode. By placing the ring sufficiently far from the core, e.g., such that $R_{3i}$ is greater than about 4a, it can be assured that, at least in some fiber designs, the ring affects only the tails of the waveforms.

Results of exemplary calculations for a depressed cladding silica-based fiber ($2a=8.3$ $\mu$m, $\Delta^+=0.25\%$, $\Delta^-=0.15\%$) are given in Table I, in which $\alpha_{1.20}$ is the (longitudinal) attenuation constant for $LP_{11}$ at a wavelength of 1.20 $\mu$m (i.e., below the cut-off wavelength of the fiber), for a straight fiber, and $\alpha_{1.60}$ is the macrobending attenuation constant for $LP_{01}$ at a wavelength of 1.60 μm (i.e., above the cut-off wavelength of the fiber) for fiber having a constant 1.5 inch radius of curvature.

TABLE I

| | | Calculated Leakage Loss | |
|---|---|---|---|
| Ring | $R_{2i}/a$ | $LP_{11}$ $\alpha_{1.20}$ (dB/m) | $LP_{01}$ $\alpha_{1.60}$ (dB/km) |
| None | 6.5 | 2.85 | 1.62 |
| None | 7.5 | 0.41 | 0.12 |
| Yes (W = 2a, h = 0.20 | 7.5 | 2.70 | 0.205 |

The above results show that increasing the thickness of the inner cladding results in decreased attenuation for $LP_{11}$ and decreased bending loss for $LP_{01}$, whereas addition of the ring to the fiber with increased cladding thickness substantially increases the attenuation of $LP_{11}$, without substantially affecting the bending loss of $LP_{01}$.

The details of the effects produced by addition of a ring depend, inter alia, on the parameters of the ring, as is exemplified by the data in Table II. The fiber was again assumed to be a depressed index cladding fiber of the type shown in FIG. 3, with $2a=8.3$ μm, $R_{2i}/a=6.5$, $\Delta^+=0.25\%$, $\Delta^-=0.15\%$.

TABLE II

| | | Calculated Leakage Loss | |
|---|---|---|---|
| Ring | | $LP_{11}$ | $LP_{01}$ |
| W/2a | h (% $\Delta^-$) | $\alpha_{1.20}$ (dB/m) | $\alpha_{1.60}$ (dB/km) |
| 1.25 | 30 | 173 | 4.3 |
| | 20 | 26.7 | 3.1 |
| | 10 | 7.6 | 2.2 |
| 0.75 | 30 | 37.6 | 3.0 |
| | 20 | 12.3 | 2.4 |
| | 10 | 5.4 | 2.0 |
| None | | 2.85 | 1.62 |

The results show that, for the fiber and the rings considered, suppression of $LP_{11}$ is greatest for the "widest" and "highest" ring. Addition of a ring with $W/2a=1.25$, and $h=30\%$ was found to reduce $\lambda_c$ from about 1.21 μm to about 1.14 μm.

FIG. 4 shows exemplary computed contours of those ring parameters (W, h) that result in cut-off wavelengths of 1.20, 1.15, 1.10, and 1.05 μm, in a depressed cladding silica fiber of the type depicted in FIG. 3, with $2a=8.3$ μm, $R_{2i}=R_{3o}$, $R_{2i}/a=6.5$, $\Delta^+=0.25\%$, and $\Delta^-=0.15\%$. In the absence of the ring (i.e., $h=W=0$), the cut-off wavelength of the fiber is 1.21 μm. The contours show that beyond a certain ring height that depends on the ring width, the cut-off wavelength depends substantially only on the width. For instance, when $W=1.2a$ and $h \geq 0.5 \Delta^-$, $\lambda_c$ is 1.15 μm; increasing W to 1.8a gives $\lambda_c=1.10$ μm, for $h \geq 0.6 \Delta^-$.

Figure 5:
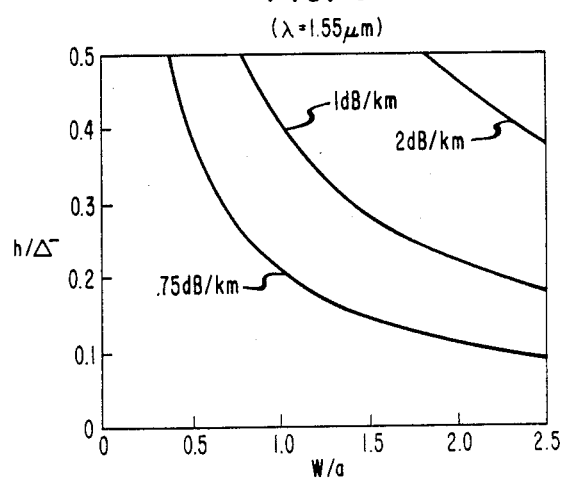
FIG. 5 shows macrobending contours for exemplary depressed index fibers according to the invention, for a range of ring parameters.

The exemplary computed contours in FIG. 5 indicate the ring parameters that result in macrobending loss of $LP_{01}$ (for 1.5 inch radius of curvature) of 0.75 dB/km, 1.0 dB/km, and 2 dB/km at a wavelength of 1.55 μm, for the fiber that was used in FIG. 4. With no ring the loss is calculated to be 0.56 dB/km. The contours indicate that macrobending loss grows slowly with the ring size. As mentioned before, this growth can be prevented by an increase of the deposited cladding thickness.

Figure 6:
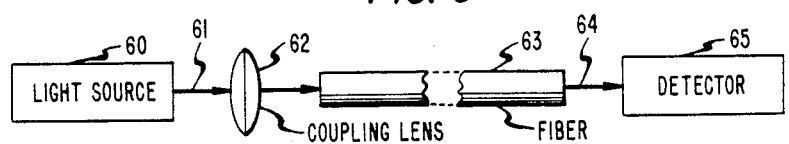
FIG. 6 schematically shows an exemplary fiber communications system according to the invention.

FIG. 6 schematically shows a telecommunication system comprising a radiation source 60 which emits radiation 61, coupled by coupling means 62 into fiber 63. The radiation is guided axially through the fiber and is emitted from the output end of the fiber. Emitted radiation 64 is detected by detector 65. The detector output can be processed by known means. Optical communications systems are well known to those skilled in the art and need no detailed discussion here. It will be appreciated that all the optical fiber in a system according to the invention can be fiber according to the invention. On the other hand, such a system may contain prior art fiber, as well as fiber according to the invention. Typically, a length of inventive fiber may be optically coupled to prior art fiber, thereby forming an optically continuous transmission path for radiation of the system operating wavelength.

EXAMPLE

A preform was manufactured by the standard MCVD process. The preform refractive index profile was measured and the fiber core diameter corresponding to a standard 125 μm diameter fiber was determined to be 8.3 μm. From the same measurement, the normalized refractive index difference $\Delta$ was found to be 0.36%, $\Delta^-=0.12\%$, $h/\Delta^-=0.28$, $W/a=2.1$. Several fibers were drawn from the collapsed preform by a standard method, the outside diameter of the fibers being 125 μm. These fibers were found to have an average cut-off wavelength of 1.20 μm and an average loss (including the macrobending loss induced by a three inch radius of curvature) of 0.25 dB/km at 1.55 μm. A similarly prepared fiber, with essentially the same parameters ($2a=8.3$ μm, $\Delta=0.37\%$, $\Delta^-=0.12\%$) as the above described inventive fiber, except having no index ring, was found to have a cut-off wavelength of 1.28 μm and a loss at 1.55 μm of 0.24 dB/km for the same radius of curvature. Other fiber characteristics such as spot size and bandwidth were substantially the same in the two fibers.

What is claimed is:
1. Optical fiber adapted for guiding electromagnetic radiation, guided radiation comprising a $LP_{01}$ mode and, possibly, a $LP_{11}$ mode, the fiber being a single mode fiber for electromagnetic radiation of an operating wavelength, the optical fiber to be referred to as the first fiber, the first fiber comprising
(a) a core region having an equivalent radius a and an equivalent maximum refractive index $n_c$;
(b) a first cladding region surrounding the core and having an equivalent outer radius $R_{1o}$, an equivalent inner radius $R_{1i}$, and an equivalent refractive index $n_1$, with $n_1 < n_c$; and
(c) a second cladding region surrounding the first cladding region and having an equivalent inner radius $R_{2i}$ and an equivalent refractive index $n_2$, with $n_2 \geq n_1$;
characterized in that
the first fiber further comprises a third cladding region having an equivalent inner radius $R_{3i}$, an equivalent outer radius $R_{3o}$, and an equivalent refractive index $n_3$, with $R_{3o} \leq R_{2i}$, $R_{1o} \leq R_{3i}$, and $n_3 > n_1$; wherein $n_3$, $R_{3i}$ and $R_{3o}$ are chosen such that
(d) at $R_{3i}$ the square of the amplitude of the $LP_{01}$ mode is at most $10^{-5}$ of the square of the amplitude of the $LP_{01}$ mode at the center of the core, for radiation of the operating wavelength of the optical fiber;
(e) at $R_{2i}$ in the first fiber, the square of the amplitude of the $LP_{11}$ mode is at least 50% larger than the square of the amplitude of the $LP_{11}$ mode in a sec- ond fiber at a radius equal to $R_{2i}$, the second fiber being identical to the first fiber except that in the second fiber $R_{3i}=R_{3o}$, the third cladding region thus being absent in the second fiber, the second fiber having a cut-off wavelength, the squares of the amplitudes being compared at the cut-off wavelength of the second fiber; and (f) at $R_{2i}$ and at the operating wavelength, the square of the amplitude of the $LP_{01}$ mode in the first fiber is at most 50% larger than the square of the amplitude of the $LP_{01}$ mode in the second fiber, at the same wavelength and the same radius.

2. Fiber of claim 1, wherein $R_{3o}=R_{2i}$.

3. Fiber of claim 2, wherein $R_{1i}=a$, and $R_{1o}=R_{3i}$.

4. Fiber of claim 3, wherein $n_1<n_2$.

5. Fiber of claim 4, wherein $R_{3i}\geq 4a$.

6. Fiber of claim 5, wherein $n_1<n_3<n_2$.

7. Fiber of claim 6, wherein $0.1\Delta^-\leq h\leq 0.75\Delta^-$, with $h=(n_3^2-n_1^2)/(n_2^2-n_1^2)$, and $\Delta^-=(n_2^2-n_1^2)/2n_2^2$.

8. Fiber of claim 7, wherein $R_{3o}-R_{3i}\geq a$.

9. Fiber of claim 7, wherein $R_{2i}/a\geq 6.5$.

10. Fiber of claim 4, wherein the first fiber is a silica-based fiber, and at least the first and the third cladding regions comprise fluorine.

11. Fiber of claim 10, wherein the core comprises an element selected from the group consisting of Ge, Al, and P.

12. An optical fiber communication system comprising optical fiber according to claim 1, and further comprising a source of electromagnetic radiation of wavelength substantially equal to the operating wavelength, means for coupling the radiation into the optical fiber at a first fiber region, and means for detecting radiation emitted from the fiber at a second fiber region spaced from the first fiber region.

13. System according to claim 12, wherein $R_{3o}=R_{2i}$, $R_{1i}=a$, $R_{1o}=R_{3i}$, $n_c\geq n_2$, $n_1\leq n_2$, and $n_1<n_3$.

14. System according to claim 13, wherein $0.1\Delta^-\leq h\leq 0.75\Delta^-$, with $h=(n_3^2-n_1^2)/(n_2^2-n_1^2)$, and $\Delta^-=(n_2^2-n_1^2)/2n_2^2$, and $R_{3o}-R_{3i}\geq a$.

15. System according to claim 14, wherein $R_{2i}/a\geq 6.5$.

16. System according to claim 15, wherein $n_1<n_2$.

17. System according to claim 12, wherein at least the first and the third cladding regions comprise fluorine.

18. System according to claim 12, wherein the core comprises an element selected from the group consisting of Ge, Al, and P.

19. System according to claim 12, wherein at $R_{2i}$ and at the cut-off wavelength of the second fiber, the square of the amplitude of the $LP_{11}$ mode in the first fiber is at least 100% larger than the square of the amplitude of the $LP_{11}$ mode in the second fiber, at the same wavelength and the same radius.

20. System according to claim 19, wherein at $R_{2i}$ and at the operating wavelength, the square of the amplitude of the $LP_{01}$ mode in the first fiber is at most 10% larger than the square of the amplitude of the $LP_{01}$ mode in the second fiber, at the same wavelength and the same radius.

* * * * *